United States Patent [19]

Clausen et al.

[11] Patent Number: 4,503,108
[45] Date of Patent: Mar. 5, 1985

[54] REINFORCED PAPER PRODUCT

[75] Inventors: Victor H. Clausen; Charles E. Asbury, both of Vancouver, Wash.

[73] Assignee: H. B. Fuller Company, St. Paul, Minn.

[21] Appl. No.: 557,649

[22] Filed: Dec. 2, 1983

Related U.S. Application Data

[62] Division of Ser. No. 322,893, Nov. 19, 1981, Pat. No. 4,451,515.

[51] Int. Cl.$^3$ .......................... B32B 3/02; B32B 29/02
[52] U.S. Cl. ..................................... 428/108; 428/109; 428/110; 428/112; 428/114; 428/136
[58] Field of Search ..................... 428/105, 107–110, 428/112, 113, 114, 154, 136

[56] References Cited

U.S. PATENT DOCUMENTS 1,197,315  9/1916  Wendler ............................ 428/114
2,772,718 12/1956  Magnuson ......................... 154/176

Primary Examiner—Paul J. Thibodeau
Attorney, Agent, or Firm—Merchant, Gould, Smith, Edell, Welter & Schmidt

[57] ABSTRACT

A method and device for use in the method for forming a reinforcing filamental network is the subject of this application. The network includes a pair of straight filaments (54, 56) which can extend generally parallely with respect to one another and be spaced at a given distance. A serpentine filament (58) is made to sinuate across the straight filaments (54, 56), and can be bonded thereto at intersections by means of a hot melt adhesive which impregnates the filaments (54, 56, 58) and which has a measure of flow potential when subjected to pressure.

The device for forming the network includes a cylindrical cam (100) which is disposed for rotation about an axis generally parallel to the axis of one of two pressure rollers (76, 90) which effect cold flow of the hot melt adhesive with which the filaments (54, 56, 58) are impregnated. The cam (100) has a groove (110) formed in its outer surface. A shoe (108) of a reciprocating filament guide (102) rides in the groove (110). The groove (110) extends both circumferentially and axially in the outer surface of the cam (100). The cam (100) is geared to rotation of one of the pressure rollers (76, 90) so that, as the pressure rollers (76, 90) feed the filaments (54, 56, 58) therethrough, the reciprocating guide (102) will move axially along the rollers (76, 90) in order to effect sinuating of the serpentine filament (58).

5 Claims, 10 Drawing Figures

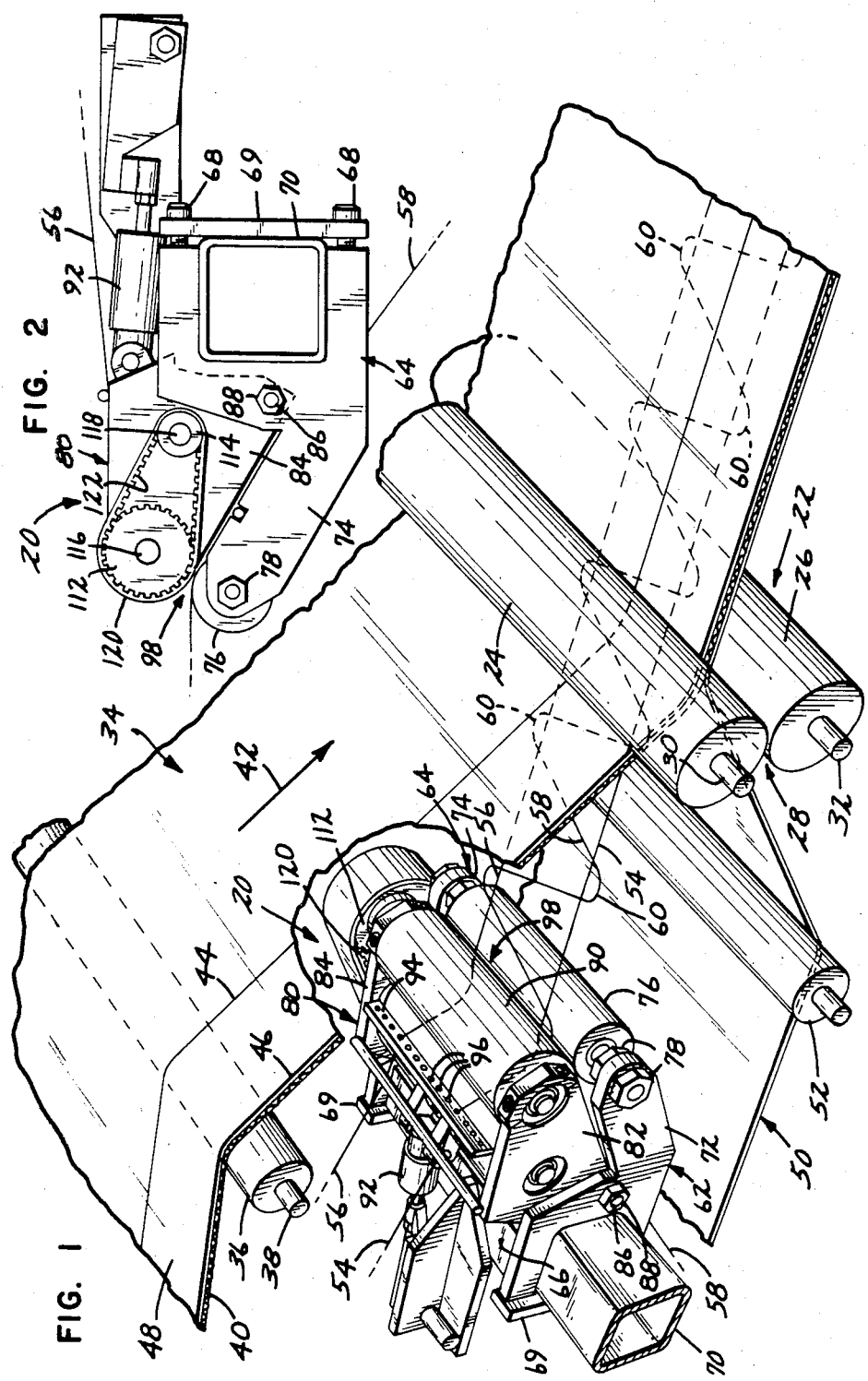

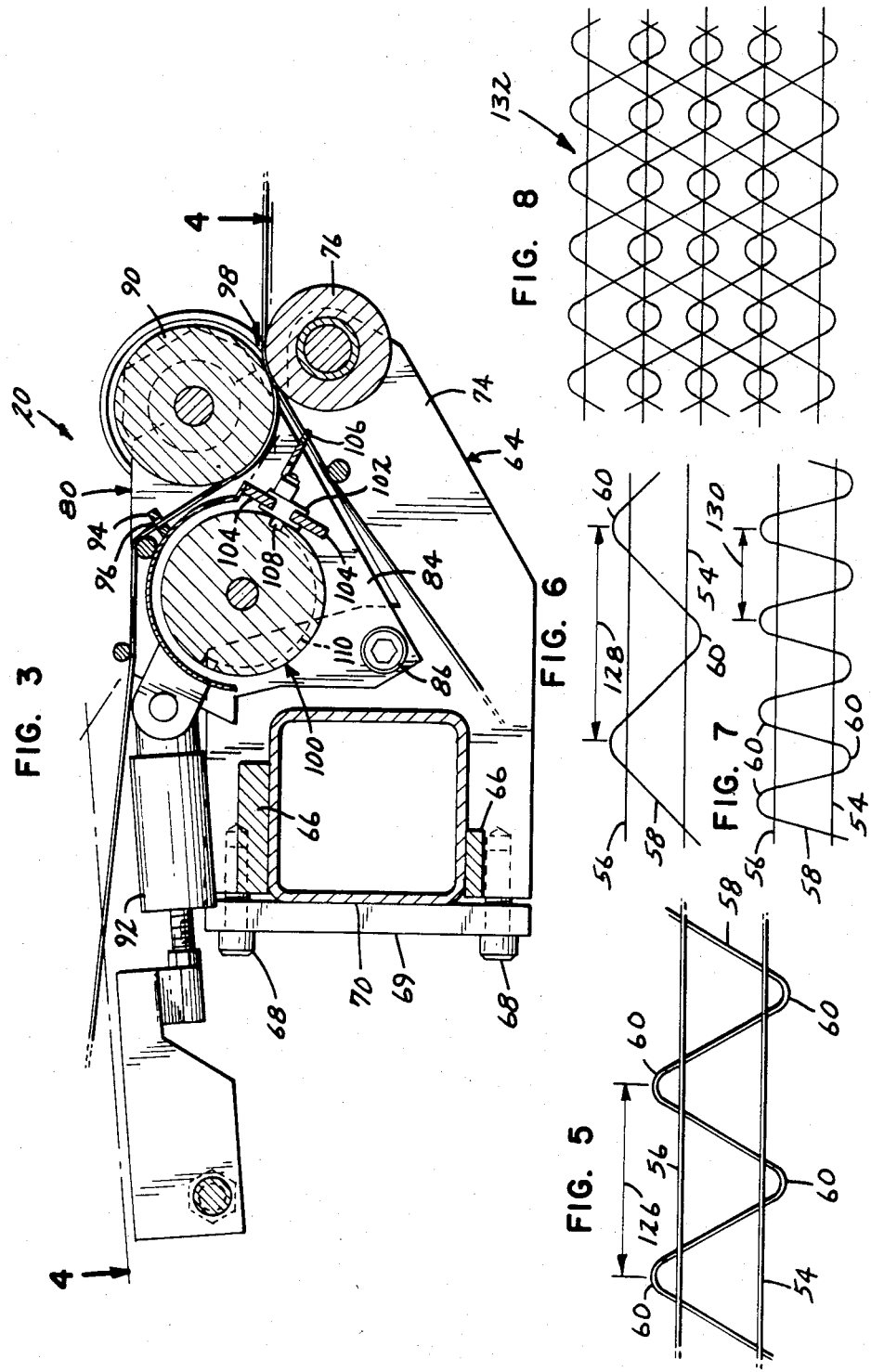

REINFORCED PAPER PRODUCT

This is a division of application Ser. No. 322,893, filed Nov. 19, 1981 and now U.S. Pat. No. 4,451,515.

TECHNICAL FIELD

The invention of the present application is broadly related to the field of reinforcement networks for use in strengthening products manufactured from material such as corrugated board and paper. More specifically, the invention is directed to the field of reinforcement networks wherein the reinforcing materials are filamental in nature. In a preferred embodiment, the invention relates to a reinforcing network wherein filaments comprising the network are coated with an adhesive by which the network can be bonded together at intersections of the filaments and, when assembled, to a web of corrugated board or paper which carries the network.

BACKGROUND OF THE INVENTION

Because of the nature of the applications to which various corrugated board and paper products are put, the products are frequently subjected to forces in excess of those which the products can be reasonably expected to withstand. Grocery bags are one product illustrative of the problems which can be encountered. One material of which grocery bags can be made is kraft paper. Frequently, such products are manufactured giving them a double thickness in order to limit the risks of bag failure by ripping when a bag becomes overloaded. In some instances, grocery bags are made of special heavy duty kraft paper in attempting to provide them with the necessary strength. When double thicknesses of kraft paper are used, however, an inordinate cost can be incurred.

Even with bags strengthened as described above, adequate strength is not always achieved. Such inadequacies are highlighted by the fact that grocery stores frequently insert one manufactured bag inside another prior to filling a bag with groceries.

The problems are similar in the case of corrugated board boxes. Generally, corrugated cardboard boxes are stronger than paper products and able to withstand stronger forces. In some respects, this additional strength can be attributed to the corrugation interposed between adjacent substrates of the box. Typically, however, the users of the end products tend to overload them to a point at which they are unable to withstand the force applied.

The examples articulated thus far are two typical examples of which the average layman is well aware. Other applications do, however, exist for paper and corrugated board products. Sheets of corrugated board are used to form corrugated cardboard pallets for use in material handling. A typical pull sheet is made dimensioned four feet by four feet, and a score line is impressed into the sheet extending generally parallel to, and proximate, one of the edges. A flap thereby formed between the score and the edge to which the score is proximate is able to be pivoted about the score and can serve as a lip by which the sheet can be grabbed. Lift trucks used to manuever the commodities carried by the pallets typically include clamps which can grab onto the flap of the pull sheets to pull the pallet onto a flat lift plate on the lift truck. Frequently, the pallets carry commodities in bags, drums, or other containers which contain materials weighing in excess of one ton. As can be seen, even absent the reduced strength which is present at the score line, the pull sheets are subjected to significant forces. When a score as described above is present, however, the pulling of the pallet by the clamping mechanism on the lift truck effects a concentration of stresses at the score line.

In recognizing the shortcomings various companies have attempted to particularly strengthen the pull sheets at the score line. It has become common practice to interpose an extra lamina into the sheet overlapping with the score. Such a lamina is typically a strip of strong kraft liner board extending along the scoring. As in the case of paper bags, the expense added to the cost of the product because of the extra cost of the kraft paper can be significant. Even more importantly, however, overall production expenses are significantly raised because of the additional time involved in being required to insert this strip during the production process.

It has been recognized that both paper and corrugated board products can be reinforced with filamental strands and tapes which are coated with an adhesive to bond the reinforcing material network to the paper or board to which it is applied. Products reinforced in this manner generally allow the use of lighter web substrates and afford greater load carrying capacities. Even with such reinforcing networks, however, problems yet exist. Typical networks known in the art comprise strands or tapes which provide strength primarily in one direction. This is so because they are aligned generally in straight parallel lines. In the case of corrugated board pull sheets, the strands or tapes are made to extend substantially perpendicular to the flutes of the corrugation. The product thereby formed in given an increased strength in a direction perpendicular to the flutes (that is, in a direction in which the reinforcing strands or tapes extend). The network formed by the reinforcing material, however, gives little, if any, increased strength in a direction transverse to the direction in which the strands or tapes extend. Although an improved resistance to tearing in a direction parallel to the flutes is imparted to the product, tearing in a direction generally perpendicular to the flutes can still readily occur.

H. B. Fuller Company, the assignee of the present application, has recognized the advantages which can be obtained in placing reinforcement filaments in serpentine patterns across the corrugated board or paper substrates. U.S. patent application Ser. No. 047,255, now abandoned, is for a WEB REINFORCED WITH STRING-TYPE ADHESIVE AND METHOD OF MANUFACTURING SAME. That application discloses a reinforcing network utilizing serpentine patterns of reinforcing filaments. Such networks provide additional strength in directions both parallel to and perpendicular to the directions in which the flutes of the corrugation extend. Although the structure and method of the above-referenced application is a significant improvement over the prior art relevant to that application, a number of deficiencies still remain. Since the guide bar which carries the guide eyelets for movement across the direction in which the substrates are made to move is operated independent of the mechanism for moving the substrates, extremely close coordination must be maintained between the movements of the substrates and the guide bar in order to insure that the wave of reinforcing filament will have a constant frequency. In order to insure this coordination, the substrates must be passed through the double backer pressure application device at a slower speed than might otherwise be allowed.

Additionally, problems can be encountered in obtaining the desired amplitude of the wave formed. If the reinforcing network forming machine is located in a narrow room, space might not be available to permit the desired transverse movement of the guide bar in order to achieve a wave having the amplitude sought.

It is to these deficiencies in the prior art that the invention of the present application is directed. It provides apparatus for forming a network which strengthens paper and cardboard products in a multiplicity of directions, and the present application includes claims directed to the products thereby created. The claims of the present application are also directed to a process for forming such products.

SUMMARY OF THE INVENTION

The invention of the present application is a filamental reinforcing network for insertion into a product, typically formed of either corrugated board or paper, to strengthen the product against shearing forces. The invention also includes a method and device for forming such a filamental network. The network includes at least two generally linearly extending filaments. The network further includes a serpentine filament sinuating across adjacent of the generally extending filaments.

In a preferred embodiment of the reinforcing network, the serpentine filament can sinuate in a sinusoidal-like pattern with peaks of the waves thereby formed extending laterally beyond one of two adjacent of the generally linearly extending filaments.

In a particular application in which the reinforcing filamental network is sandwiched between a fluted web and a liner sheet utilized in manufacturing a corrugated board product, the reinforcing network can be manufactured having a single pair of substantially parallel, generally linearly extending filaments. These generally linear filaments can be positioned relative to a position at which a score line is subsequently formed in the corrugated board product such that they straddle the score line. The product thereby formed is given significantly increased strength at the score line. The reinforcing network can be applied between the web and liner sheet so that each of the generally linearly extending filaments will be parallel to the score line and spaced a similar distance therefrom. The score line thereby forms an axis about which the sinusoidal-like configured filament sinuates.

A reinforcing network as described above can be used to strengthen paper products such as paper bags. The network which would be used for reinforcing this type of product would typically have more than two generally linearly extending filaments. The network formed for this application can include a plurality of such filaments wherein pairs of adjacent filaments have a filament sinuating to form a sinusoidal-like wave extending across a path defined by said pair of adjacent filaments. Adjacent sinuating filaments can be given similar frequencies and have amplitudes so that peaks of the waves formed can overlap.

A network formed in this manner can be inserted between adjacent substrates of kraft paper used in manufacturing paper bags. Such bags can, thereby, be manufactured to have a desired minimum strength while, concurrently, minimizing the expense involved in manufacture.

As previously mentioned, the invention also includes a device for forming the products described above. The device includes a pair of pressure rollers forming a nip between the rollers. The generally parallel and genearlly linearly extending filaments are drawn into the nip between the rollers. The device can include a cylindrical cam which is mounted for rotation about an axis generally parallel to axes of the pressure rollers. The cam has a groove formed in its outer surface in which a shoe extending from a guide for governing the point of insertion of the serpentine filament into the nip is seated. The groove extends both circumferentially and axially along the cam so that, as the cam is made to rotate, the guide will be moved axially along the nip, thereby varying axially the location at which the serpentine filament is inserted into the nip.

In a preferred structure, the groove formed in the outer surface of the cylindrical cam is such that, during five rotations of the cam, a single sinusoidal-like wave will be formed by the filament being fed through the moveable guide. The groove formed in the surface of the cam will be such that the amplitude of the wave formed by the filament is great enough so that the serpentine filament will intersect the two generally parallel and generally linearly extending filaments.

All of the filaments, or, alternatively, only the serpentine filament or only the generally linearly extending filaments, can be impregnated with a hot melt adhesive. The particular adhesive selected would have a measure of cold flowability so that, when the filaments are subjected to pressure, the adhesive would flow and allow the filaments to be bonded together at their intersections.

The pressure rollers of the device effect this function. The rollers are spaced closely proximate one another so that the filaments are drawn into the nip formed between the rollers and pressure is applied causing the adhesive to flow allowing bonding of the filaments together.

In assembling a corrugated board product as previously discussed, bonding of a filament network can be initiated and a forward end of the network formed be fed into the nip between two rollers of a double-backer corrugated cardboard product forming mechanism. One of the rollers of the double-backer is mechanized to rotate about its longitudinal axis. The network formed will, thereby, be drawn through the pressure rollers of the device. As it is so drawn, the pressure rollers will be caused to rotate.

The device can include means for translating the rotational motion of one of the pressure rollers to the cylindrical cam. This means can include sprockets mounted to the ends of axles about which each of the cylindrical cam and the one pressure roller rotate. The sprockets can have transmission means, such as an endless belt, extending therearound. With a device so structured, it can be seen that the powering of one of the rollers of the double-backer can be transmitted to the cylindrical cam via one of the pressure rollers. Consequently, power need not be applied directly to the device for effectuating sinuating of the serpentine filament.

The invention of the present application is thus a filamental network for reinforcing corrugated board and paper products and similar type structures and a device and method for forming such a network. More specific features and advantages will become apparent with reference to the detailed description of the invention, claims, and appended drawings.

BRIEF DESCRIPTION OF THE DRAWINGS

FIG. 1 is a perspective view of a device for forming a reinforcing network in combination with a double-backer corrugated product forming apparatus, some portions broken away;

FIG. 2 is a side elevational view of the device for imparting sinuating movements to one of the reinforcing filaments;

FIG. 3 is an enlarged side sectional view of the device of FIG. 2;

FIGS. 5-10 are figures illustrating various different filamental reinforcement patterns.

DETAILED DESCRIPTION OF THE INVENTION

Figure 4:
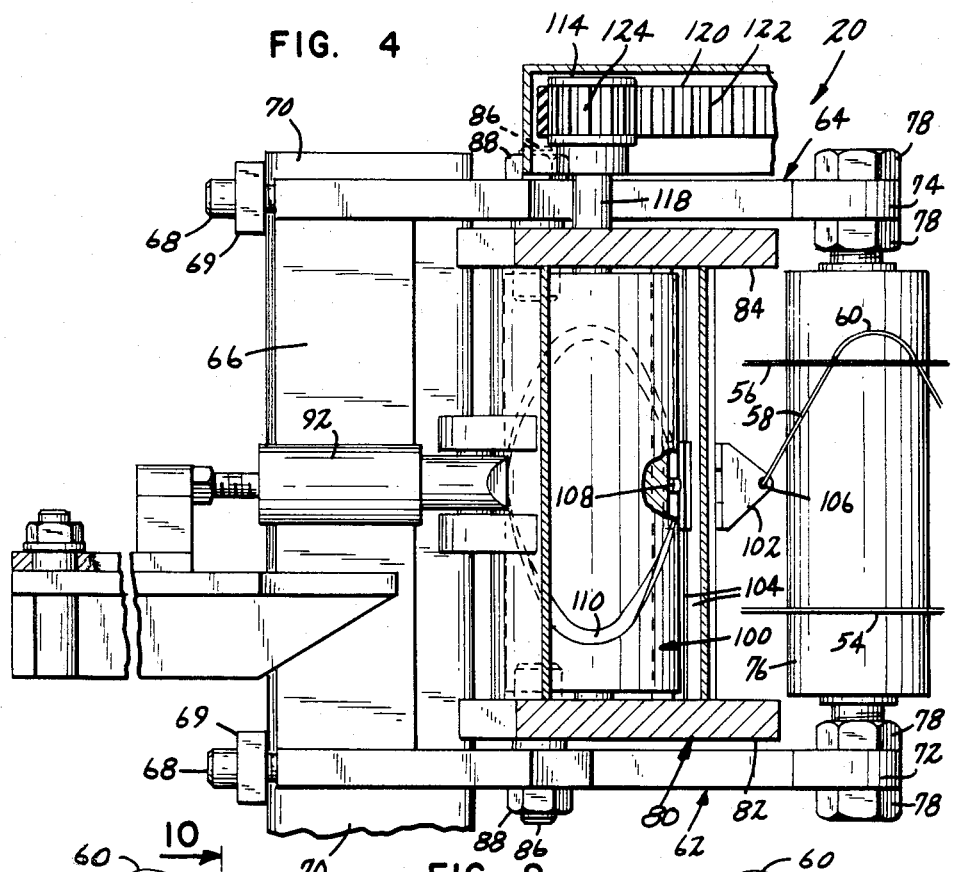
FIG. 4 is a view taken generally along the line 4—4 of FIG. 3.

In the Drawings, like reference numerals are used to denote like elements throughout the several views. Referring then to the Drawings, and particularly, to FIGS. 1 through 4, a device for forming a reinforcing filamental network for strengthening products such as corrugated cardboard and kraft paper products is illustrated.

In FIG. 1, the device 20 is shown in combination with a double backer corrugated cardboard product forming mechanism 22. The double backer 22 essentially consists of two rollers 24, 26 forming a nip 28 therebetween. The rollers 24, 26 are mounted to respective axles 30, 32 for rotation about longitudinal axes of the axles 30, 32. Outer peripheral surfaces of the rollers 24, 26 can be disposed closely proximate one another so that sheet-like structures drawn into the nip 28 between the rollers 24, 26 can be brought together at the nip 28.

As seen in FIG. 1, a web 34 is fed over a redirection roller 36 and down to the nip 28 formed between the rollers 24, 26 of the double backer 22. The redirection roller 36 is mounted for rotation about an axle 38 in a manner similar to the double backer rollers 24, 26.

On one side of the web 34, corrugated flutes 40 are carried. The flutes 40 extend generally perpendicular to the direction of movement of the web 34 through the double backer 22 as indicated by arrow 42.

The web 34 is shown as having a score line 44 extending substantially parallel to one edge 46. It will be understood, however, that score line 44 is illustrated only to show the location in web 34 where a score line is formed, and that actual formation is appropriately effected only after web 34 is adhered to a liner sheet 50.

The score line 44 bifurcates the web 34 into two portions. That portion of the web which lies between the score line 44 and the edge 46 thereof to which the score line 44 is proximate defines a lip 48 of a corrugated board product to be formed. The lip 48 defines a plane which can be pivoted about the score line 44 to vary the angle between the plane and a plane defined by the other portion of the web 24. The product which is ultimately formed can, thereby, serve as a pull sheet for use in a cardboard pallet. The lip 48 can function as a location which can be grabbed by a clamp of a vehicle for moving the pallet. With the clamp securely fastened to the lip 48, the pallet can be pulled onto a generally planar support surface for subsequent transportation.

A liner sheet 50 is also run over a redirection roller 52 substantially the same as the one over which the web 34 is run. Thereafter, the sheet 50 is also fed to the nip 28 between the rollers 24, 26 of the double backer 22.

At least one of the rollers 24, 26 of the double backer 22 is mechanized so that it can be selectively activated and deactivated. When in an activated mode, it will function to draw the web 34 and liner sheet 50 into the nip 28 between the rollers 24, 26 and through the rollers 24, 26.

It will be understood that by impressing a score line into the web 34, the pull sheet which is formed comprising web 34 and liner sheet 50 will have a point of reduced strength along the score line 44 in the web 34 because of the concentration of stresses at the line 44. This will be true even though the liner sheet 50 might not be scored.

In order to strengthen the product along the score line 44 a flexible filamental reinforcing network is formed and drawn into the nip 28 of the double backer 22 intermediate the web 34 and liner sheet 50. The network includes a pair of generally linear, substantially parallel filaments 54, 56. These generally linearly extending filaments 54, 56 are drawn into the nip 28 of the double backer 22 so that they generally symmetrically straddle the score line 44.

A serpentine filament 58 is fed into the double backer 22 with it sinuating across the two generally linearly extending filaments 54, 56. In a preferred embodiment, the wave formed by the serpentine filament 58 is sinusoidal-like in nature but having generally linearly extending portions between peaks 60. The wave is formed about the score line 44 as an axis, and peaks 60 of the wave extend alternately on opposite sides of the score line 44, the peaks 60 extending just outwardly beyond the generally linearly extending filament 54 or 56 on the particular side of the score line 44. It will be understood that filaments 54, 56, 58 need not be monofilamental and that multiple strand filaments are contemplated as being within the scope of the invention.

It is within the scope of the invention to form such a reinforcing structure in any manner. The filaments 54, 56, 58 can be inserted into the nip 28 of the double backer 22 as an integrated network with the serpentine filament 58 being bonded to the straight filaments 54, 56 at points of intersection. To this end, the filaments 54, 56, 58, or, alternately, only the serpentine filament 58 or only the substantially parallel filaments 54, 56, can be coated with a hot melt adhesive having a measure of cold flow potential. The particular hot melt adhesive must have sufficient resistance to sticking to a supply roll (not shown) and adjacent strands of the filament but enough cold flow potential so that, when pressure is applied in a manner to be described hereinafter, the adhesive will flow sufficiently to bond the filaments 54, 56, 58 together at the intersections.

The hot melt adhesive should also have characteristics wherein, when the product leaving the double backer 22 is subjected to elevated temperature in a corrugated heated press (not shown) which functions to effect adhesion of the web 34 to the liner sheet 50, it will "wet out" the substrates between which it is sandwiched and result in a strong bonding of the reinforcing network to the substrates over a wide range of both speeds and temperatures to which the reinforced board is subjected. One particular hot melt adhesive which meets these objectives can be made according to the following formula:

| Amount | Material | Trade Name |
|---|---|---|
| 15% | paraffin wax | SUNWAX 5512 |
| 5% | synthetic wax | PARAFLINT H-1 |
| 40% | tackifying resin | NEVEX 100 |
| 40% | ethylene vinyl acetate copolymer | ELVAX 240 |

A particular network forming device 20 for forming an integrated network to be fed into the double backer 22 is seen in FIG. 1 and illustrated in more detail in FIGS. 2, 3, and 4. The device 20 includes a pair of generally parallel, laterally spaced side walls 62, 64 separated by transverse members 66. The side walls 62, 64 are held and maintained at a fixed distance from one another along the transverse members 66.

Bolt/nut arrangements 68 and members 69, as best seen in FIG. 4, can function to secure device 20 to a mounting clamp 70. Mounting clamp 70 extends from one of the side walls 62. The clamp 70 can be secured by appropriate means to mount the device 20 in a desired relative position with respect to the web 34, liner sheet 50, and double backer rollers 24, 26.

Each wall 62, 64 includes a forwardly extending arm 72, 74. A first bearing mounted roller 76 is journaled between these arms 72, 74 and maintained in position by appropriate securing means such as nuts 78. The roller 76 is bearing mounted so that it can freewheel.

The device 20 carries an assembly 80 mounted between the side walls 62, 64 and disposed for pivoting toward and away from the first roller 76. The assembly 80 further includes a pair of generally parallel, spaced side walls 82, 84, each of the side walls 82, 84 being positioned closely proximate, and parallel to, a corresponding side wall 62, 64 of the device 20. Shafts 86 to which the assembly 80 is mounted, and about the axes of which the assembly 80 pivots, are fastened to the side walls 62, 64 of the device 20. Again, appropriate securing means such as nuts 88 are used to secure the shafts 86 to the side walls 62, 64.

Journaled between the side walls 82, 84 of the assembly 80 is a second roller 90. This roller 90 is mounted for rotation about an axis generally parallel to that about which the first roller 76 rotates.

A toggle clamp 92 of a type known in the art can be utilized to pivot the assembly 80 about the shaft 86. The second roller 90 can, thereby, be selectively engaged with, and disengaged from, the first roller 76.

The second roller 90 can be biased against the first 76 by toggle clamp 92 so that the total pressure exerted by the second roller 90 against the first 76 can be selectively varied between values of 10 lbs. and 200 lbs. The particular desired pressure will, of course, depend upon the characteristics of the hot melt adhesive with which any of the filaments 54, 56, 58 forming the reinforcing network are impregnated, since it is the function of the rollers 76, 90 to effect the necessary measure of cold flow under pressure in order to bond the filaments 54, 56, 58 together at their intersections.

Mounted atop the pivoting assembly 80 is a stationary string guide 94. The string guide 94 is shown as being a generally bar-like element having a plurality of apertures 96 formed therein. The apertures 96 extend generally along a straight line and are spaced from one another at substantially equal intervals. Filaments 54, 56, those to be fed into the nip 28 of the double backer rollers 24, 26 being linearly configured, are fed from a supply spool (not shown) through tension controlling mechanisms (not shown) and into selected of the apertures 96 for directing them into the nip 98 between the first and second rollers 76, 90 of the device 20.

In a particular application, it is desirable that the straight filaments 54, 56 be spaced from one another at approximately 4 inches. In order to so space the straight filaments 54, 56, apertures 96 spaced from one another approximately 4 inches are selected as the ones through which the filaments 54, 56 are made to run.

A cylindrical cam 100 is journaled for rotation between the side walls 82, 84 of the pivotally mounted assembly 80. The cam 100 is affixed to the side walls 82, 84 so that, when the second pressure roller 90 engages the first 76, it is positioned rearwardly of the engaged rollers 76, 90. The cam 100 is disposed for rotation about an axis which extends generally parallel to the longitudinal axes about which the rollers 76, 90 rotate.

A reciprocating filament guide 102 is mounted to a track 104 extending between the lateral walls 82, 84 of the pivotally mounted assembly 80. The guide 102 includes an eyelet 106 positioned closely proximate the nip 98 formed between the pressure rollers 76, 90 when they are in engagement, and the guide 102 is disposed for movement along the track 104 so that the eyelet 106 reciprocates along the nip 98 formed between the rollers 76, 90 on the side thereof from which the filaments 54, 56, 58 are fed into the nip 98.

The third filament 58 extends from a storage spool (not shown), through the eyelet 106, and into the nip 98 between the pressure rollers 76, 90. The axial location along the roller 76, 90 at which this third filament 58 will be inserted depends upon the position of the guide 102 during its reciprocating movement.

The guide 102 is driven reciprocally by means of a shoe 108 extending therefrom being seated in a groove 110 formed in the outer peripheral surface of the cylindrical cam 100. The groove 110 is continuous, extending circumferentially about the cylinder and having a component in an axial direction.

As previously indicated, the cam 100 is disposed for rotation about an axis generally parallel to the axes of the pressure rollers 76, 90. As the cam 100 is driven, therefore, about its axis, the shoe 108 riding in the groove 110, and, in turn, the reciprocating filament guide 102 with its eyelet 106, is driven along the nip 98 between the pressure rollers 76, 90 to the point at which is positioned that portion of the groove 110 immediately proximate the nip 98.

The groove 110 can be such that the wave formed by the filament 58 will extend laterally beyond the straight filaments 54, 56. That is, the axial extremeties of the groove 110 formed in the surface of the cam 100 will be laterally beyond the particular apertures 96 in the stationary filament guide 94 through which the straight filaments 54, 56 are fed. Additionally, the groove 110 can be such that it is centered with respect to where the score line 44 will be formed in the web 34, and such that one wave of the sinuating filament 58 is formed during five rotations of the cam 100. A groove 110 which would accomplish the formation of one serpentine wave during one rotation of the cam is shown in FIG. 4 for purposes of illustration.

It is desirable to cause sinuation of the serpentine filament 58 such that the wave thereby formed is sinusoidal-like having a constant frequency. In order to effect the formation of a sinusoidal-like wave, rotation of the cam 100 is geared directly to rotation of one of the pressure rollers and, more specifically, to the second pressure roller 90. As best seen in FIG. 2, sprockets 112, 114 can be mounted to stub shafts 116, 118 extending from the axles by which the cam 100 and second pressure roller 90 are disposed for rotation and on the outside of the lateral wall 84 of the pivotally mounted assembly 90. An endless belt 120 having teeth 122 sized and spaced to mesh with teeth 124 in the sprockets 112, 114 can extend about the sprockets 112, 114. As the pressure rollers 76, 90 rotate, therefore, and draw the filaments 54, 56, 58 into the nip 98 between rollers 76, 90, the cam 100 will be driven at a desired relative speed to provide a uniform frequency of the wave formed by the network. The faster the speed at which the pressure rollers 76, 90 are made to rotate, the faster the reciprocating filament guide 102 will be driven axially along the nip 98. This feature is particularly advantageous since, in a preferred embodiment, the pressure rollers 76, 90 are not powered directly, but, rather, are driven by one of the rollers 24, 26 of the double backer 22. Since circumstances might dictate that the rate of passage of the substrates through the double backer 22 be varied, a non-uniform frequency of wave would be imparted to the network if movement of the reciprocating guide 102 were not geared to speed of rotation of the pressure rollers 76, 90.

A typical network formed by this type of device is illustrated in FIG. 5. With a network used for one purpose, it is desirable to have a frequency of 9 inches as indicated at 126.

For other applications, however, it is desirable that either decreased or increased frequencies 128, 130, as seen in FIGS. 6 and 7 respectively, be given to the wave. Such frequencies varying from a normal frequency of 9 inches can be accomplished without changing the cam 100. The sprocket 114 carried by the stub shaft 118 extending from the axle with respect to which the cam 100 rotates can be removable and be replaced by a sprocket having a different diameter. If the diameter of the sprocket replacing the standard sprocket were larger than that of the standard, the cam 100 would rotate slower relative to the speed of the pressure rollers 76, 90, thereby decreasing the frequency of the wave formed. If, on the other hand, the diameter of the sprocket replacing the standard sprocket were smaller than that of the standard, the cam 100 would be made to rotate at a speed faster relative to the speed of rotation of the pressure rollers 76, 90, thereby increasing the frequency of the wave formed.

It will be understood that it might be desirable to integrate the filaments 54, 56, 58 into a unified network, but to not immediately feed the network into the assembly of a corrugated cardboard product. The network could still be formed since the pressure of the rollers 76, 90 will cause flow of the hot melt adhesive. The formed network can, however, be wound onto a spool for later use. When such operation is desired, however, rotation of the pressure rollers 76, 90 would have to be by direct power rather than being effected indirectly by the double backer 22 drawing the network in the desired direction. To this end, the shaft of a motor (not shown) could be coupled to the stub shaft 116 of the second pressure roller 90 projecting from the lateral wall 82 of the pivotally mounted assembly 80.

FIG. 8 illustrates a reinforcing network 132 which might be inserted between substrates of kraft paper used to manufacture paper bags. The network can be formed using the device 20 illustrated in the figures, but with minor modifications. One way of accomplishing formation of the network illustrated in FIG. 8 would be to form a basic network and, thereafter, run the network through again with the straight filaments 54, 56 extending through different apertures 96 in the stationary filament guide 94 and using a different cam displacing axially the groove which effects sinuation of the serpentine filament 58.

Figure 9:
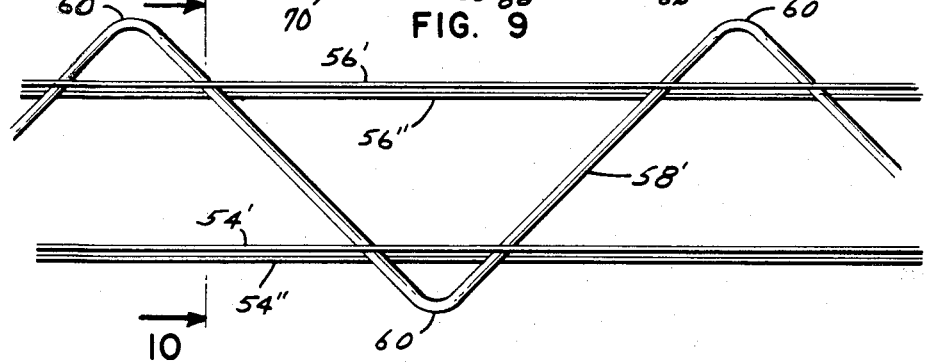
Figure 10:
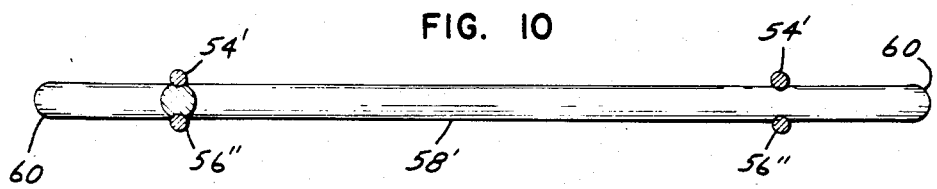

Another embodiment of the reinforcing network utilizes two pairs of straight filaments 54', 54'', 56', 56'' and one filament 58' sinuating across the two pairs of straight filaments 54', 56'. In this embodiment, the sinuating filament 58' is made to overlie one of the pairs of straight filaments 54', 56' with the second pair 54'', 56'' positioned on the opposite side of the sinuating filament 58'. This construction enhances the reinforcing characteristics of the system because the filament members are bonded together more firmly. Additionally, the material cost can be minimized by using straight filament members which are each half the weight of the sinuating filament. The total volume of filament utilized is, therefore, the same as in a system wherein only one pair of straight filments is utilized. Such a reinforcing system is illustrated in FIGS. 9 and 10.

Numerous characteristics and advantages of the invention have been set forth in the foregoing description. It will be understood, however, that this disclosure is, in many respects, only illustrative. Changes may be made in details, particularly in matters of shape, size, and arrangement of parts without exceeding the scope of the invention. The invention's scope is defined by the language in which the appended claims are expressed.

What is claimed is:

1. A reinforced paper product, comprising:
   (a) a plurality of overlying paper sheet substrates;
   (b) means for adhering adjacent of said substrates together in said overlying relationship;
   (c) wherein said product thereby formed is scored to bifurcate said product into two portions, one on either side of said scoring, defining planes, the angle between which can be varied by pivoting one of said portions relative to the other of said portions about said scoring
   (d) a filament reinforcing network bonded to and intermediate adjacent of said adhering substrates comprising:
     (i) a plurality of generally parallel and generally linearly extending filaments straddling said scoring; and
     (ii) a plurality of generally sinusoidally configured filaments, each sinuating across and bonded to pairs of adjacent of said generally linearly extending filaments.

2. A product in accordance with claim 1 wherein said generally sinusoidally configured filaments form waves having peaks, said peaks extending laterally beyond one of a pair of said adjacent of said generally linearly extending filaments.

3. A product in accordance with claim 2 wherein peaks of adjacent of said generally sinusoidally configured filaments overlap.

4. A product in accordance with claim 3 wherein waves of adjacent of said generally sinusoidally configured filaments have similar frequencies.

5. A product in accordance with claim 4 wherein said peaks are axially coextensive.

* * * * *